United States Patent
Cheng et al.

(10) Patent No.: US 10,685,287 B2
(45) Date of Patent: Jun. 16, 2020

(54) COMPUTING WITH ITERATIVE KNOWLEDGE MANAGEMENT MECHANISM AND METHOD OF OPERATION THEREOF

(71) Applicant: Samsung Electronics Co., Ltd., Suwon-si, Gyeonggi-Do (KR)

(72) Inventors: Doreen Cheng, San Jose, CA (US); Jie Bao, San Jose, CA (US); Justin Martineau, San Jose, CA (US); Yunsong Meng, Fremont, CA (US)

( * ) Notice: Subject to any disclaimer, the term of this patent is extended or adjusted under 35 U.S.C. 154(b) by 669 days.

(21) Appl. No.: 14/186,309

(22) Filed: Feb. 21, 2014

(65) Prior Publication Data
US 2014/0279726 A1    Sep. 18, 2014

Related U.S. Application Data

(60) Provisional application No. 61/789,321, filed on Mar. 15, 2013.

(51) Int. Cl.
*G06N 5/02*    (2006.01)

(52) U.S. Cl.
CPC ..................... *G06N 5/02* (2013.01)

(58) Field of Classification Search
CPC ........................................... G06N 5/02
See application file for complete search history.

(56) References Cited

U.S. PATENT DOCUMENTS

| | | | |
|---|---|---|---|
| 5,911,776 A * | 6/1999 | Guck | G06F 17/30569 707/999.104 |
| 2010/0169299 A1* | 7/2010 | Pollara | G06F 17/277 707/708 |
| 2011/0131209 A1* | 6/2011 | Bechtel | G06N 5/025 707/737 |
| 2013/0091086 A1* | 4/2013 | Hively | G06N 99/005 706/50 |
| 2014/0095505 A1* | 4/2014 | Blanchflower | G06F 17/30091 707/737 |

OTHER PUBLICATIONS

Mulwad, V., Finin, T., & Joshi, A. (2012). A Domain Independent Framework for Extracting Linked Semantic Data from Tables. Maryland: LNCS vol. 7538.
J. Bao, P. Basu, et al., "Towards a theory of semantic communication," in Proceedings of IEEE Network Science Workshop (NSW), Jun. 2011.
Ontology Systems. (2011). Search, don't integrate. Retrieved from Ontology Whitepaper: http://www.ontology.com/resources/whitepapers/.

* cited by examiner

*Primary Examiner* — Vincent Gonzales
*Assistant Examiner* — Kevin W Figueroa

(57) ABSTRACT

A computing system includes: a control unit configured to operate a knowledge discovery component to extract knowledge from data, operate a knowledge engineering component to perform a knowledge extension or a knowledge evolution on the data or the knowledge; and a user interface, coupled to the communication unit, configured to operate an interface component to interact with the knowledge discovery component and the knowledge engineering component.

21 Claims, 5 Drawing Sheets

COMPUTING WITH ITERATIVE KNOWLEDGE MANAGEMENT MECHANISM AND METHOD OF OPERATION THEREOF

CROSS-REFERENCE TO RELATED APPLICATION(S)

This application claims the benefit of U.S. Provisional Patent Application Ser. No. 61/789,321 filed Mar. 15, 2013, and the subject matter thereof is incorporated herein by reference thereto.

TECHNICAL FIELD

An embodiment of the present invention relates generally to a computing system, and more particularly to a system for knowledge management.

BACKGROUND

Modern consumer and industrial electronics, such as graphical computing systems, televisions, projectors, cellular phones, portable digital assistants, and combination devices, are providing increasing levels of functionality to support modern life. In addition to the explosion of functionality and proliferation of these devices into the everyday life, there is also an explosion of data and information being created, transported, consumed, and stored.

The explosion of data and information comes in different types, e.g. text, sounds, images, as well as for different domains/applications, e.g. social networks, electronic mail, web searches, and different formats, e.g. structure, unstructured, or semi-structured. Research and development for handling this dynamic mass of data and information in existing technologies can take a myriad of different directions.

Thus, a need still remains for a computing system with iterative knowledge management mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a control unit configured to operate a knowledge discovery component to extract knowledge from data, operate a knowledge engineering component to perform a knowledge extension or a knowledge evolution on the data or the knowledge; and a user interface, coupled to the communication unit, configured to operate an interface component to interact with the knowledge discovery component and the knowledge engineering component.

An embodiment of the present invention provides a method of operation of a computing system including: extracting, with a control unit, knowledge from data; performing a knowledge extension or a knowledge evolution on the data or the knowledge; and interacting with the knowledge discovery component and the knowledge engineering component.

An embodiment of the present invention provides a non-transitory computer readable medium including instructions for execution, the instructions including: extracting knowledge from data; performing a knowledge extension or a knowledge evolution on the data or the knowledge; and interacting with the knowledge discovery component and the knowledge engineering component.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
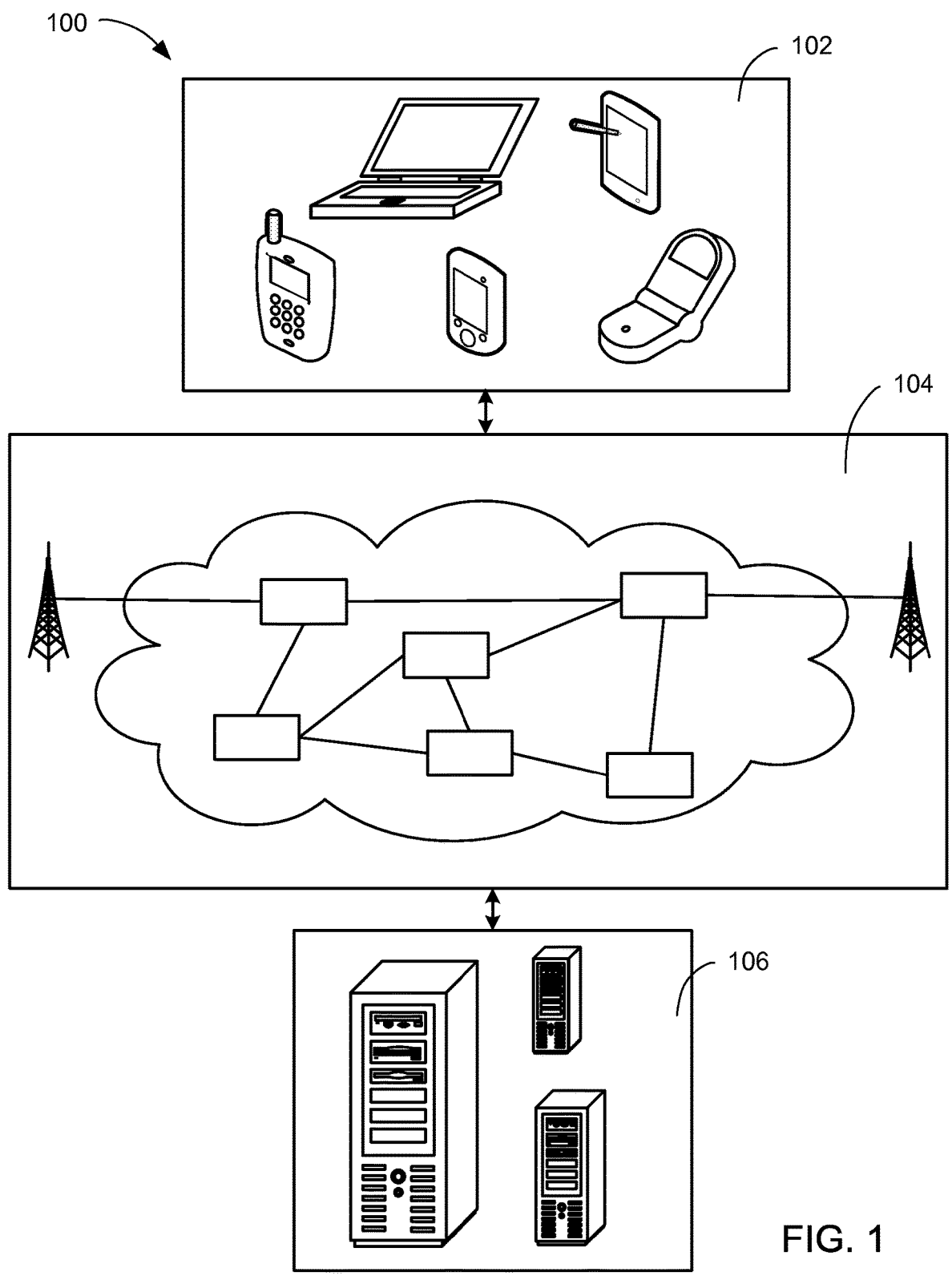
FIG. 1 is a computing system with iterative knowledge management mechanism in an embodiment of the present invention.

An embodiment of the present invention provides a method and system configured to support interactive and iterative knowledge discovery, knowledge extension, and knowledge model and schema evolution. An embodiment of the present invention can include four components.

A first component can automatically identify, from a knowledge store, the candidates for knowledge extension. The first component is a knowledge extension component that automatically identifies candidates for a requested knowledge extension from the knowledge store.

A second component can automatically identify, from a knowledge store, the candidates for knowledge model and schema evolution. The second component can be referred to as a knowledge evolution component that automatically identifies candidates for a requested knowledge evolution from the knowledge store.

A third component can generate data from a knowledge store, optionally by the combined use of a knowledge store and other data sources, so that the generated data is suitable for analysis and machine learning. The third component can be referred to as a data handler that can generate data from a knowledge store to a data space that is suitable for analysis and machine learning.

A fourth component can enable interactive and iterative knowledge discovery and knowledge engineering without requiring users' prior experience on knowledge engineering. The fourth component can be a crowd sourcing platform for ontology and inference enhanced iterative data mining/machine-learning from Web and private data sources.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "knowledge discovery" is for extracting knowledge from data. The term "knowledge engineering" includes knowledge modeling, construction, extension, and evolution. The term "knowledge extension" is for updating the instance part of knowledge. The term "knowledge evolution" is for updating models of knowledge, such as ontology, schema, or a combination thereof of a model.

The term "module" and "component" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with iterative knowledge management mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

Users of the first device 102, the second device 106, or a combination thereof can communicate with each other or access or create information including text, images, symbols, location information, and audio, as examples. The users can be individuals or enterprise companies. The information can be created directly from a user or operations performed on these information to create more or different information. The communication involving can take more different forms, as described more in FIG. 2.

In the connected world, information creation, transmission, and storage are pervasive as well as the desire to consume all these information by the users. However, the shear mass of information makes it impossible to effectively and efficiency consume or deliver the right information and the right time.

Returning to the description of the computing system 100, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the communication path 104 to communicate with the second device 106 or can be a stand-alone device.

For illustrative purposes, the computing system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, text or a combination thereof.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of network types and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
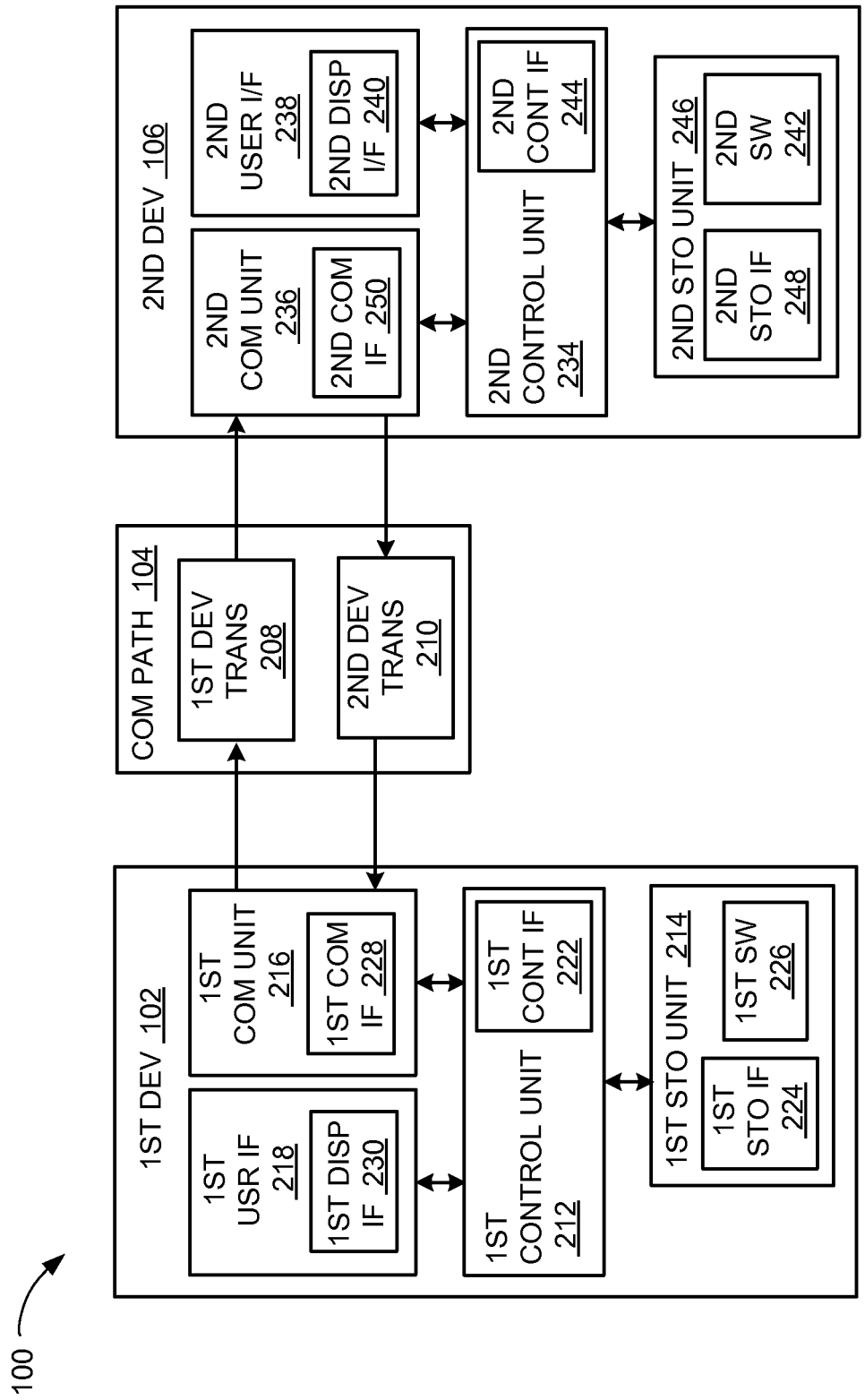
FIG. 2 is an exemplary block diagram of the computing system.

Referring now to FIG. 2, therein is shown an exemplary block diagram of the computing system 100. The computing system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 212, a first storage unit 214, a first communication unit 216, and a first user interface 218. The first control unit 212 can include a first control interface 222. The first control unit 212 can execute or operate a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

A first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

A first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or a combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the communication path 104 via the first communication unit 216.

The second device 106 can be optimized for implementing the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute or operate a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 3:
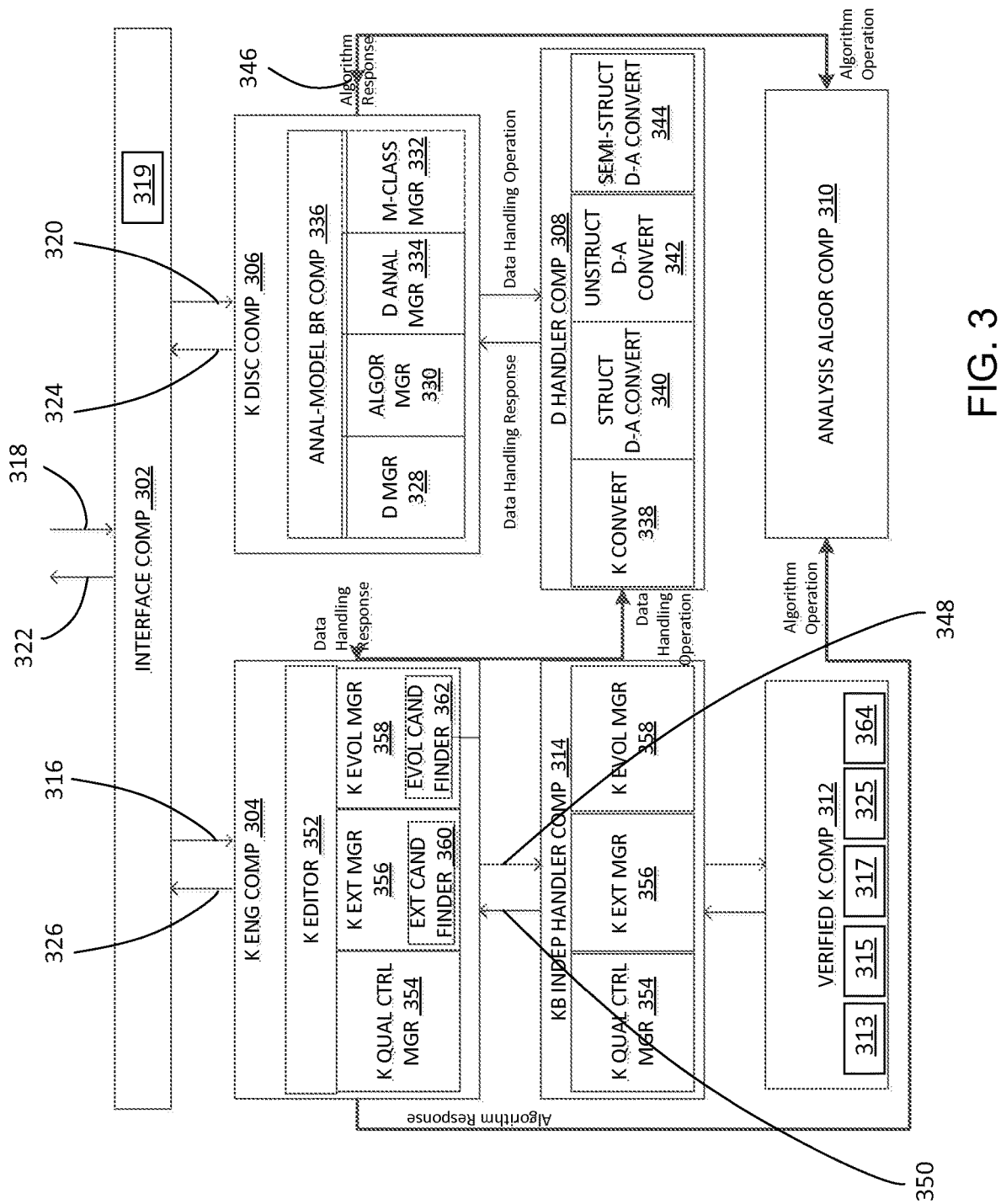
FIG. 3 is a system architecture of the computing system.

Referring now to FIG. 3, therein is shown a system architecture of the computing system 100. The computing system 100 can include an interface component 302, a knowledge engineering component 304, a knowledge discovery component 306, a data handler component 308, an analysis algorithms component 310, and a verified knowledge component 312. The computing system 100 can also optionally include a knowledge-base independent operation handler component 314 enabling the computing system 100 to operate on knowledge engineering operations 316 on multiple knowledge bases with different knowledge models 315 and operation methods. If the knowledge-base independent operation handler component 314 is not used, then the knowledge engineering component 304 and the verified knowledge component 312 can be directly connected.

The interface component 302 supports system interaction to and from the computing system 100. The interface component 302 can interface to other parts of the computing system 100 or external to the computing system 100. The interface component 302 can also allow for user interaction or user interface with the computing system 100.

The interface component 302 can allow the computing system 100 receive requests 318, as an example user requests, to view and respond to the information given by the computing system 100 in an iterative knowledge discovery and knowledge engineering process. The request 318 can include data 319. The interface component 302 can transform the requests 318 to operations and dispatches the operations, for example for the data 319, to the corresponding components as shown in the FIG. 3. Examples of these operations are knowledge discovery operations 320 and the knowledge engineering operations 316 to the knowledge discovery component 306 and the knowledge engineering component 304, respectively.

The interface component 302 can provide interface responses 322 to another portion of the computing system 100 or to a destination external to the computing system 100, such as another electronic system or to a user. The interface responses 322 can be based on knowledge discovery responses 324 or the knowledge engineering responses 326 generated by the knowledge discovery component 306 and the knowledge engineering component 304, respectively. The knowledge discovery responses 324, the knowledge engineering responses 326, or a combination thereof can provide the data 319 that can be different than the data 319 originally provided through the request 318. The interface component 302 can allow for viewing and interaction with the computing system 100 based on the interface responses 322, including receiving or issuing the requests 318, which can be new based on the interface responses 322.

The knowledge discovery component 306 can interact with the external environment with the knowledge discovery operations 320 and the knowledge discovery responses 324 to select the data 319, apply analysis algorithms to the data 319, and interact with the results of these algorithms to create knowledge 325. The knowledge discovery component 306 can include a data manager 328, an algorithm manager 330, a model-classifier manager 332, a data analysis manager 334, and an analysis-model browser component 336. The knowledge discovery component 306 handles communication between its subcomponents, which carry out the requests 318 provided by the communication with the interface component 302.

The data manager 328 can receive the knowledge discovery operations 320 to select and load the data 319 and convert the data 319 to a form that is suitable for analysis. The data manager 328 can manage both the data 319 and the data handler component 308. The data 319 can also represent the knowledge 325 if retrieved from the verified knowledge component 312.

The algorithm manager 330 can receive the knowledge discovery operations 320 to select, modify, set parameters, and run algorithms on the data 319. The algorithm manager 330 also allows tailoring the algorithms to pre-determined needs, including accepting new code for new algorithms or to modify or append or replace existing algorithms. The algorithm manager 330 can interact with the analysis algorithms component 310 to obtain the algorithm to be used by the algorithm manager 330 or to store modifications to the algorithm made by the algorithm manager 330.

The model-classifier manager 332 can receive the knowledge discovery operations 320 to store models 315 with available provenance data and any relevant notes received from the external environment. These models 315 may be used multiple times by the data analysis manager 334.

The data analysis manager 334 provides storage of the algorithm results from the algorithm manager 330. The data analysis manager 334 can also support the visualization and examination of the algorithm results, as well as provenance data and notes received from the external environment, through the knowledge discovery responses 324 and the interface component 302.

The analysis-model browser component 336 combines, subdivides, or aggregates the analysis results from the algorithm manager 330 and the models 315 from the model-classifier manager 332 for further analysis. The analysis-model browser component 336 can interact with the external environment through the requests 318 invoking the knowledge discovery operations 320 and results provided through the knowledge discovery responses 324 and the interface responses 322.

The analysis-model browser component 336 helps facilitate knowledge formation and relationship discovery. An example of this process involves a machine learning model to tag the sentiment of a tweet with Twitter™ being used with an information extraction model that has been trained to extract television shows that a tweet is talking about. In this example, the analysis-model browser component 336 could help the discovery which television shows are popular among Twitter™ users.

The data handler component 308 is used to format the specified data 319 or the knowledge 325 from the knowledge base or the outside world for use by the specified analysis algorithm in the algorithm manager 330. The data handler component 308 includes four types of data handlers, as an example. These data handlers can be knowledge converters 338, structured data converters 340, unstructured data converters 342, and semi-structured data converters 344. The selection of the correct type of data handler can be simplified by the computing system 100 by matching the data types of the input and output of the data handlers to the data and the analysis algorithm in the algorithm manager 330 or specified by the user.

The knowledge converters 338 is a knowledge to analysis data convertor and transforms knowledge, such as ontology or instances, into a form that is suitable for analysis by the selected algorithm. For example, the ontology or schema knowledge is represented as a graph that can be transformed into an incidence matrix, an adjacency matrix, a Laplacian matrix, or a distance matrix.

The structured data converters 340 convert structured data, such as relational database tables, or semantic web data, such as resource description framework (RDF). For example, RDF can be converted to a machine learning friendly format by Statistical Relation Learning (SRL) methods.

The knowledge convertor 338 can dynamically detect the correct converter to use based upon the input type of the data analysis algorithm and the performance metrics from a sample execution of the data analysis algorithm. This is also true for the structured data converters 340.

It has been discovered that the knowledge convertor 338, the structured data converters 340, or a combination thereof greatly impacts performance because the dynamic detection for the correct converter to use is based on the best choice of features to use when converting the knowledge. The dynamic detection avoids having to resort to hand-build convertors because this kind of feature engineering is a critical part of machine learning. The dynamic detection also avoids human bias of what some subjectively believe is the best way for the specific problem based on their individual expertise but is not necessarily the case. The auto-detection by the knowledge convertor 338, the structured data converters 340, or a combination thereof allows users to use an embodiment of the present invention who are not necessarily be machine learning experts.

The unstructured data converters 342 convert unstructured data, such as text data and image data. For example, text data can be converted into a Bag-of-Words (BoW) vector for machine learning using regular expressions to recognize word boundaries.

The semi-structured data converters 344 include metadata organized as name-value pairs. For example, semi-structured data can be converted to structured data for a domain independent framework for extracting linked semantic data from tables. As a more specific example, the column headers, cell values, caption text, and surrounding text of the semi-structured data can be used converted into structured data using graphical models and probabilistic reasoning.

The analysis algorithms component 310 manages the algorithms that are used for analysis either for knowledge discovery purposes or for knowledge engineering purposes. For example, the knowledge discovery component 306 or more specifically the algorithm manager 330 sends a discovery algorithm operation to the analysis algorithms component 310. The analysis algorithms component 310 provides a discovery algorithm response 346 to the knowledge discovery component 306 for the algorithm manager 330 to run the provided algorithm on the data.

Examples algorithms include shallow and deep Natural Language Parsing (NLP), Named Entity Recognition (NER), supervised and unsupervised machine-learning, reasoning algorithms, graph cuts, graph flow algorithms, etc. Logical reasoning can include subsumption, abduction, closure, justification, class instantiation, and role filling. Examples of reasoning algorithms can include RETE (a pattern matching algorithm), linear resolution with selection function for definite clauses (SLD resolution), Tableau algorithm, and simple forward-chaining. The graph cut and flow algorithms can be embodied by the Java Universal Network Graph (JUNG) library. For platforms and toolkits, all or a subset of their capabilities can be exported to the UI and the subcomponents of the knowledge discovery component can be a wrapper of the platform(s) or toolkit(s) that are used.

The followings are the algorithms that are managed by the algorithm manager 330: supervised and unsupervised machine-learning, reasoning algorithms, graph cuts, graph flow algorithms. The analysis algorithms are producing knowledge. The unstructured data convertor 342 can make use of the following algorithms: shallow and deep Natural Language Parsing (NLP), Named Entity Recognition (NER).

It has been discovered that the embodiment of the present invention improves performance because of the way that different algorithms are managed by the algorithm manager 330 so that data is automatically dynamically converted into machine learning friendly representation.

Returning now to the knowledge engineering portion of the description of the computing system 100, the knowledge engineering component 304 updates the model 315 and instances in the verified knowledge component 312. The knowledge engineering component 304 can interact with the verified knowledge component 312 with knowledge-base dependent engineering operations 348 from the knowledge engineering component 304 and knowledge-base engineering responses 350 from the verified knowledge component 312. The knowledge-base engineering responses 350 can be responses that can be knowledge dependent or independent depending on the presence and operation of the knowledge-base independent operation handler component 314.

The knowledge engineering component 304 also provides interaction with the external environment, such as the user to interactively update the model 315 and instances in the verified knowledge component 312. The knowledge engineering component 304 can provide knowledge engineering responses 326 to the interface component 302. The knowledge engineering component 304 can include a knowledge editor 352, a knowledge quality control manager 354, a knowledge extension manager 356, and a knowledge evolution manager 358. The knowledge extension manager 356 can include an extension candidate finder 360. The knowledge evolution manager 358 can include an evolution candidate finder 362.

Examples of the knowledge engineering operations 316 as inputs to the knowledge engineering component 304 include the knowledge to be updated, or a list of relevant machine generated knowledge suggestions matching specified criteria. The knowledge can be updated with the knowledge editor 352, received through the interface component 302, or a combination thereof.

The machine generated knowledge suggestions or knowledge candidates 313 can be generated by the extension candidate finder 360. The knowledge engineering component 304 can respond through the knowledge engineering responses 326 to a knowledge update with the status of the update operation, the results of the update operation, or intermediate results from a reasoning algorithm.

The knowledge extension manager 356 is responsible for updating the instance knowledge. The knowledge evolution manager 358 is responsible for updating the knowledge model 315, which can be an ontology, a schema 317, or a combination thereof.

The knowledge quality control manager 354 is responsible for identifying possible problems with the new knowledge update and helping to resolve these problems. This typically includes checking for correctness, consistency, and completeness.

Consistency checking can be done using formal logical methods. This results into Boolean value that can be cast into 1 or 0. Correctness can be calculated by first constructing a test set of known facts. Then ask the knowledge base if the facts are true. The knowledge quality control manager 354 can measure the percentage of the wrong answer for correctness and the percentage of the questions that cannot be answered in a reasonable time for completeness. These metrics can then be balanced based on weighted harmonic mean or the arithmetic mean.

The knowledge engineering component 304 links to existing knowledge in the verified knowledge component 312. As an example, the knowledge engineering component 304 can help the user specify his knowledge with the links to existing knowledge in the verified knowledge component 312 using the knowledge editor 352 to input the user's knowledge. The knowledge editor can be embodied with visual knowledge editors with graphical user interface or other a laymen friendly user interface.

The knowledge engineering component 304 can use the input from the knowledge editor 352 while communicating with the verified knowledge component 312 to determine how to best represent the user's input using the knowledge editor 352 that is specific to the verified knowledge stored in the verified knowledge component 312. The conversion will be sent back to the user for verification or modification. The user can then send the converted knowledge back to the computing system 100 to update the knowledge store in the verified knowledge component 312.

As an example, to link the user's knowledge into the verified knowledge store in the verified knowledge component 312, the knowledge editor 352 can send the request to the knowledge extension manager 356 to find knowledge candidates 313 with potential links and matches, such as matching classes and relationships, using the extension candidate finder 360. If there are "no update candidates" for the knowledge candidates 313, then the request will be sent to the knowledge evolution manager 358, which will use the evolution candidate finder 362 to suggest model candidates 364. If there are update knowledge candidates 313 or model candidates 364 the extension candidate finder 360 or the evolution candidate finder 362, respectively, found, then the knowledge extension manager 356 or the knowledge evolution manager 358, respectively, will continue to interact with the external environment or the user with the interface component 302 until the update is successful.

The extension candidate finder 360 and the evolution candidate finder 362 can operate in the same way and can have the some functionality. The operation of one or the other is as described above.

It has been discovered that an embodiment of the present invention improves knowledge base because of the collaboration of the knowledge evolution manager 358 and the knowledge extension manager 356. Knowledge evolution is used to extend knowledge base in the schematic level: add new classes and relations. Knowledge extension is used to add new instances to a given schema 317. A schema 317 is a description or a system for understanding knowledge, a representation of that knowledge, and how the knowledge is used. The schema 317 can represent an underlying organizational pattern or structure for the knowledge or knowledge base. The schema 317 of the knowledge base evolves the knowledge evolution manager 358 to have a new schema 317 and then the knowledge extension manager 356 is called to add more instances. The collaboration of the knowledge evolution manager 358 and the knowledge extension manager 356 are not either restricted to extension with a controlled schema 317 or not based on schema 317.

The extension candidate finder 360 and the evolution candidate finder 362 can execute algorithms, such as entity resolution, name matching, and identity resolution algorithms, to identify relevant entities, instances, and concepts.

The extension candidate finder 360 and the evolution candidate finder 362 can execute algorithms, such as connectivity analysis, clique analysis, and social circle detection, to find potentially related entities given an existing entity.

The extension candidate finder 360 and the evolution candidate finder 362 can execute algorithms, such as ontology matching or coreference analysis, to find an alignment between two pieces of knowledge.

The extension candidate finder 360 and the evolution candidate finder 362 can execute algorithms, such as ontology repository search, resource description framework (RDF) search, or Linked Open Data search, to find relevant knowledge given a set of knowledge bases. The extension candidate finder 360, the evolution candidate finder 362, or a combination thereof can utilize semantic information theory and mutual information to find the best candidates or matches for the knowledge candidates 313 and the model candidates 364.

Given the input knowledge, both the knowledge extension manager 356 and the knowledge evolution manager 358 can first find at least one candidate or possibilities for the knowledge candidates 313 and the model candidates 364 to be updated from the verified knowledge component 312. The knowledge engineering component 304 can send candidates, such as the knowledge candidates 313 or the model candidates 364, with the knowledge engineering responses 326 to the interface component 302. The computing system 100 evaluates the candidates and picks best candidate using semantic information theory and mutual information and sends the best candidate for verification.

As an example, the interface component 302 or the knowledge editor 352 can display the candidates, such as the knowledge candidates 313 or the model candidates 364, to the user allowing the user to determine the right candidate to update. Once the user chooses a candidate, the knowledge 325 will then be updated accordingly in the verified knowledge component 312. If the model 315 and schema 317 need to be extended, the user can choose to extend them manually or use machine-learning based model extension. If the latter is chosen, the computing system 100 then allows the user to choose data handling in the data handler component 308, to select algorithms from the analysis algorithms component 310, such as ontology mining, concept discovery, concept hierarchy learning, rule discovery, instance-to-class alignment, frame detection, frame role filling, and to use the selected algorithms for extending the model 315.

When the user is satisfied with the results, the user can then continue to update the knowledge model 315. After either the instances are or the model 315 is updated, the knowledge quality control manager 354 will be automatically invoked. If the verification failed from the knowledge quality control manager 354, the knowledge extension manager 356 or the knowledge evolution manager 358 can provide an explanation for the verification failure. As an example, the user then needs to iteratively correct the errors, and updates the instances or remodeling, until the update is successful.

The knowledge-base independent operation handler component 314 implements knowledge-base-independent knowledge engineering operations and executes these operations by invoking the corresponding knowledgebase-dependent operations with the knowledge extension manager 356 or the knowledge evolution manager 358. In other words, it is a wrapper or mapper of one or more knowledge bases possibly with different interfaces and capabilities.

The verified knowledge component 312 stores or contains at least one knowledge base. Examples of the knowledge bases include Samsung SAGE KB™, Cyc™, TrueKnowledge™, and the Semantic Web™. Such knowledge bases should provide verification mechanisms for quality control, which typically includes checking for correctness, consistency, and completeness. The verification results should also include the location of and reasons for any failures that occur. The verified knowledge component 312 should also provide an application programming interface (API) and an implementation for finding candidates, such as knowledge candidates 313 or the model candidates 364, to update given an input knowledge to be updated. This process can be iterated many times such that the output of one iteration becomes the input of the next iteration.

The components described in FIG. 3 can be part of the first software 226 of FIG. 2, the second software 242 of FIG. 2, or a combination thereof. These components can also be stored in the first storage unit 214 of FIG. 2, the second storage unit 246 of FIG. 2, or a combination thereof. The first control unit 212, the second control unit 234, or a combination thereof can execute these modules for operating the computing system 100.

The components described in FIG. 3 can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

The interface component 302 can also be implemented by first user interface 218 of FIG. 2, the second user interface 238 of FIG. 2 or a combination thereof. The interface component 302 can also communicate between the first device 102 of FIG. 1, the second device 106 of FIG. 1, the communication path 104 of FIG. 1 or the network devices as part thereof, or a combination thereof utilizing and interacting with the first communication unit 216 of FIG. 2, the second communication unit 236 of FIG. 2, or a combination thereof.

Figure 4:
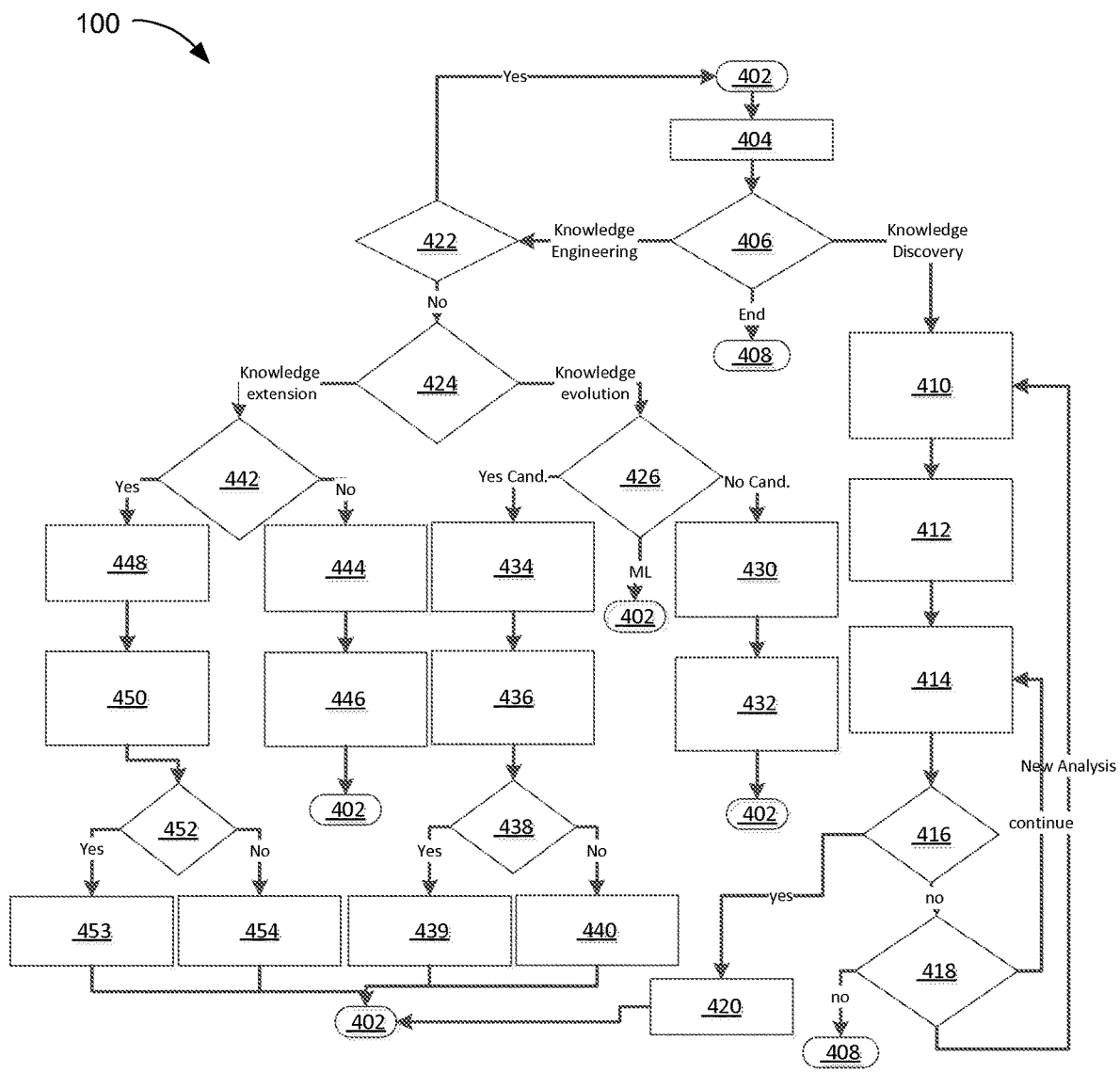
FIG. 4 is a control flow of the computing system.

Referring now to FIG. 4, therein is shown a control flow of the computing system 100. As an overview description of the control flow, when a piece of knowledge 325 of FIG. 3 is successfully extracted through knowledge discovery with the knowledge discovery component 306 of FIG. 3, a request can be made for the knowledge 325 to be integrated into the knowledge store of the verified knowledge component 312 of FIG. 3.

As an example, the computing system 100 will first ensure that the input knowledge 325 from the interface component 302 of FIG. 3 is in the proper form. The computing system 100 will then find candidate places in the knowledge store, either instances or places in the model 315 of FIG. 3 that should be updated with the input knowledge.

If the computing system 100 finds either such instances, it will then perform a test update followed by a verification process. If no error is found, the computing system 100 will commit the update and inform the user about the success. The user can then choose the new operation, which could be discovering new knowledge or update another piece of knowledge. If any error occurred by the verification process, the computing system 100 will inform the user about the error without committing the update to the verified knowledge component 312. The user can then correct the error and try again.

A detailed description of the control flow is described below. The external environment can interact with the computing system 100 at a start module 402. The computing system 100 can receive input, such as the data 319 of FIG. 3 or the knowledge 325, at an input module 404. The input module 404 can receive input from the external environment or from a user with the interface component 302. Depending upon the input received, the interface component 302 can determine if the action is for knowledge engineering or for knowledge discovery in an action query module 406.

If the input is for ending the analysis, the flow continues from the action query module 406 to an end module 408. The end module 408 stops the analysis. The term "end" is used in "end module" as a matter of convenience and not to imply an absolute end or finality of the control flow for the computing system 100. If the input is for knowledge discovery, the interface component 302 issues the knowledge discovery operations 320 to the knowledge discovery component 306. The control flow continues from the action query module 406 to a selection module 410.

As an example, the selection module 410 allows for selecting the input data 319 from the interface component 302, the data manager 328 of FIG. 3, or a combination thereof. The selection module 410 also allows for editing the input data 319 with the interface component 302. The selection module 410 can also select or edit the conversion algorithms and the analysis algorithms from the analysis algorithms component 310 of FIG. 3 with the interface component 302, the algorithm manager 330, or a combination thereof.

The flow can continue from the selection module 410 to a load module 412. The load module 412 loads and converts the input data 319 from the interface component 302 for the analysis algorithm. The load module 412 can be executed in the data manager 328, the data handler component 308, or a combination thereof.

The flow can continue from the load module 412 to a run algorithm module 414. The run algorithm module 414 executes the algorithm selected in the selection module 410. The run algorithm module 414 can be executed in the algorithm manager 330.

The results from the run algorithm module 414 are sent to a result satisfaction module 416. If the results are not satisfactory, the flow continues to a continue analysis query module 418. The continue analysis query module 418 can utilize the extension candidate finder 360, the evolution candidate finder 362, or a combination thereof to determine whether or not to continue if the scores for the potential candidates, such as the knowledge candidates 313 or the model candidates 364, are too low. A user can elect to stop as well.

If the determination in the continue analysis query module 418 is no, the computing system 100 will not continue the analysis and discovery for the input received from the interface component 302 and the flow continues to the end module 408. If the determination is the continue analysis query module 418 is yes, the analysis with the current selection of algorithms and data format can continue with the flow iterating back to the run algorithm module 414. The data analysis manager 334 of FIG. 3 can be used to view and examine the results of the analysis thus far.

The flow can also loop back to the selection module 410 from the continue analysis query module 418 if a new analysis needs to be performed on the input data 319 from the interface component 302. The data analysis manager 334 can be used to view and examine the results of the analysis thus far to aid in selecting conversion algorithms and analysis algorithms.

The result satisfaction module 416 can be executed with the data analysis manager 334, the interface component 302, the model-classifier manager 332 of FIG. 3, or a combination thereof.

Returning to the result satisfaction module 416, if the results from the run algorithm module 414 are satisfactory, then the flow can proceed to an analysis model browser module 420. The analysis model browser module 420 can be executed by the analysis-model browser component 336 of FIG. 3 for possible combining, subdividing, and aggregating the results and model 315 to commence a new analysis leading the flow back to the start module 402.

Returning to the action query module 406, if the input is for knowledge engineering, the interface component 302 issues the knowledge engineering operations 316 of FIG. 3 to the knowledge engineering component 304 of FIG. 3. The flow continues from the action query module 406 to a conversion query module 422.

If the conversion query module 422 determine yes, then the flow continues to the start module 402 for receiving additional input for the conversion needed. If the conversion query module 422 determines no, then the flow continues to an engineering action query module 424.

The engineering action query module 424 determines if the engineering action is for the purpose of knowledge extension or knowledge evolution. The engineering action query module 424 can be executed by the interface component 302 and the engineering action can be carried as part of the knowledge engineering operations 316 to the knowledge engineering component 304 or more specifically to the knowledge extension manager 356 or the knowledge evolution manager 358 depending on the engineering action.

If the engineering action query module 424 determines the engineering action to be knowledge evolution, then the flow continues from the engineering action query module 424 to an evolution candidate query module 426. The evolution candidate query module 426 determines whether the model candidates 364 of FIG. 3 have been either selected for the knowledge evolution or if the knowledge evolution will be through machine-learning based knowledge evolution. The models 315 can be selected by the input from the interface component 302. The evolution candidate query module 426 can be executed by the knowledge engineering component 304.

If the evolution candidate query module 426 determines that a candidate model has not been selected and the machine-learning based knowledge evolution has not been selected for the knowledge evolution action, then the flow can continue to an evolution find candidate module 430. The evolution find candidate module 430 identifies from the model candidates 364 with the knowledge evolution manager 358 of FIG. 3 or more specifically with the evolution candidate finder 362 of FIG. 3. The flow can continue from the evolution find candidate module 430 to a display evolution candidate module 432.

The display evolution candidate module 432 provides the from the model candidates 364 for transmission to the interface component 302 through the knowledge engineering responses 326 of FIG. 3. The flow can continue from the display evolution candidate module 432 to the start module 402.

Returning the evolution candidate query module 426, if the evolution candidate query module 426 determines a machine-based learning knowledge evolution as the knowledge evolution action, then the knowledge engineering component 304 operates with the analysis algorithms component 310 for evolving the knowledge models 315. The flow continues from the evolution candidate query module 426 to the start module 402.

Returning the evolution candidate query module 426, if the evolution candidate query module 426 determines that a candidate has been selected, then the flow continues from the evolution candidate query module 426 to an evolution update model module 434. The evolution update model module 434 updates the knowledge model 315 with the user input with the interface component 302. The flow continues from the evolution update model module 434 to an evolution quality module 436.

The evolution quality module 436 checks the new updates for the knowledge models 315 for correctness, consistency, and completeness with the knowledge quality control manager 354 of FIG. 3. The flow can continue from the evolution quality module 436 to an evolution verification query module 438.

The evolution verification query module 438 determines, with the knowledge quality control manager 354, if the new updates to the knowledge models 315 successfully passed the checks in the evolution quality module 436 for correctness, consistency, and completeness. If not, the flow can continue from the evolution verification query module 438 to an evolution transmit error module 440.

The evolution transmit error module 440 sends the errors from the evolution quality module 436 providing for an opportunity for iterative correction of the errors. For example, the errors can be sent from the knowledge quality control manager 354 with the knowledge engineering responses 326 to the interface component 302. The flow can continue from the evolution transmit error module 440 to the start module 402.

Returning to the evolution verification query module 438, if the evolution verification query module 438 determines that there are no errors from the evolution quality module 436, then the flow can continue to an evolution result module 439. The evolution result module 439 can save or commit the updates to the knowledge models 315 into the verified knowledge component 312 with the knowledge evolution manager 358. The evolution result module 439 can send the updates to the knowledge models 315 to the interface component 302 to show to the user or to share with other parts of the computing system 100. The flow can continue from the evolution result module 439 to the start module 402.

Returning to the engineering action query module 424, if the engineering action query module 424 determines the engineering action to be knowledge extension, then the flow continues from the engineering action query module 424 to an extension candidate query module 442. The extension candidate query module 442 determines whether candidate knowledge have been selected for the knowledge extension with the knowledge engineering component 304. The knowledge can be selected by the input from the interface component 302, the knowledge editor 352, or a combination thereof.

If the extension candidate query module 442 determines that a candidate has not been selected for the knowledge extension action, then the flow continues to an extension find candidate module 444.

The extension find candidate module 444 identifies candidates for the instance of knowledge to be updated with the knowledge extension manager 356 of FIG. 3 or more specifically with the extension candidate finder 360. The flow continues from the extension find candidate module 444 to a display extension candidate module 446.

The display extension candidate module 446 provides the model candidates 364 from the extension candidate finder 360 for transmission to the interface component 302 through the knowledge engineering responses 326. The flow can continue from the display evolution candidate module 432 to the start module 402.

Returning the extension candidate query module 442, if the extension candidate query module 442 determines that a candidate from the knowledge candidates 313 for the instance of knowledge 325 to be updated has been selected for the knowledge extension action, then the flow continues from the extension candidate query module 442 to an extension update knowledge module 448. The extension update knowledge module 448 updates the instance knowledge 325 with the knowledge extension manager 356. The flow continues from the extension update knowledge module 448 to an extension quality module 450.

The extension quality module 450 checks the new updates for the instance knowledge 325 for correctness, consistency, and completeness with the knowledge quality control manager 354. The flow can continue from the extension quality module 450 to an extension verification query module 452.

The extension verification query module 452 determines, with the knowledge quality control manager 354, if the new updates to the instance knowledge 325 successfully passed the checks in the extension quality module 450 for correctness, consistency, and completeness. If not, the flow can continue from the extension verification query module 452 to an extension transmit error module 454.

The extension transmit error module 454 sends the errors from the extension quality module 450 providing for an opportunity for iterative correction of the errors. For example, the errors can be sent from the knowledge quality control manager 354 with the knowledge engineering responses 326 to the interface component 302. The flow can continue from the extension transmit error module 454 to the start module 402.

Returning to the extension verification query module 452, if the extension verification query module 452 determines that there are no errors from the extension quality module 450, then the flow can continue to an extension result module 453. The extension result module 453 can save or commit the updates to the instance knowledge into the verified knowledge component 312 with the knowledge extension manager 356. The extension result module 453 can send the updates to the instance knowledge to the interface component 302 to show to the user or to share with other parts of the computing system 100. The flow can continue from the extension result module 453 to the start module 402.

The modules described in this application can be part of the first software 226 of FIG. 2, the second software 242 of FIG. 2, or a combination thereof. These modules can also be stored in the first storage unit 214 of FIG. 2, the second storage unit 246 of FIG. 2, or a combination thereof. The first control unit 212, the second control unit 234, or a combination thereof can execute these modules for operating the computing system 100.

It has been discovered that the computing system 100 provides a common platform integrating functions for interactive and iterative knowledge discovery and knowledge engineering.

The computing system 100 has been described with module functions or order as an example. The computing system 100 can partition the modules differently or order the modules differently. For example, the evolution verification query module 438 and the extension verification query module 452 can be the same module with different inputs. Also, the evolution quality module 436 and the extension quality module 450 can be the same module with different inputs.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

The modules described in this application can be implemented as instructions stored on a non-transitory computer readable medium to be executed by a first control unit 212, the second control unit 236, or a combination thereof. The non-transitory computer medium can include the first storage unit 214 of FIG. 2, the second storage unit 246 of FIG. 2, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 100 or installed as a removable portion of the computing system 100 100.

Figure 5:
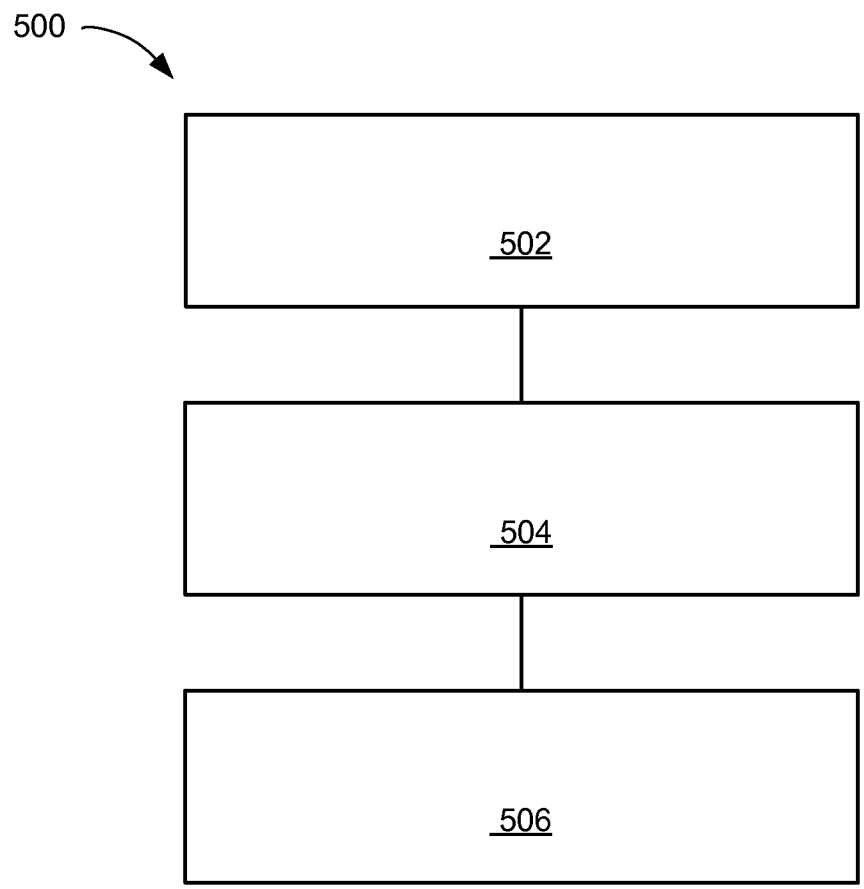
FIG. 5 is a flow chart of a method of operation of a computing system in a further embodiment of the present invention.

Referring now to FIG. 5, therein is shown a flow chart of a method 500 of operation of a computing system 100 in a further embodiment of the present invention. The method 500 includes: extracting, with a control unit, knowledge from data in a block 502; performing a knowledge extension or a knowledge evolution on the data or the knowledge in a block 504; and interacting with the knowledge discovery component and the knowledge engineering component in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit including a processor configured to:
operate a knowledge discovery component to perform an iteration of a process to extract knowledge from data via application of a first algorithm, the first algorithm comprising an analysis algorithm for performing knowledge discovery,
operate a knowledge engineering component to perform the iteration of the process to perform knowledge extension or a knowledge evolution on the data or the knowledge by application of a second algorithm, the second algorithm comprising an analysis algorithm for performing knowledge engineering, and
operate a data handler component to dynamically select a correct converter from multiple types of converters, the dynamic selection based on matching a data type of an input and a data type of an output of the correct converter to a data type of an input to be processed by a selected analysis algorithm,
wherein the multiple types of converters comprise at least one of a converter for converting structured data for use by an analysis algorithm, a converter for converting unstructured data for use by an analysis algorithm, or a converter for converting semi-structured data for use by an analysis algorithm, and
wherein the multiple types of converters include a knowledge converter to transform data represented as a graph into an incidence matrix, an adjacency matrix, a Laplacian matrix, or a distance matrix,
wherein performing knowledge discovery comprises extracting knowledge from the data via application of the first algorithm, the first algorithm implementing an updatable knowledge model, and
wherein performing knowledge engineering comprises updating one or more of the updatable knowledge model or a schema included as part of the updatable knowledge model; and
a user interface including a display, coupled to the control unit, configured to operate an interface component to interact with the knowledge discovery component and the knowledge engineering component.

2. The system of claim 1, wherein the control unit is configured to evolve or extend knowledge which is not restricted to the schema included as part of the updatable knowledge model.

3. The system of claim 1 wherein the control unit is configured to generate a knowledge candidate for the knowledge extension.

4. The system of claim 1 wherein the control unit is configured to generate a model candidate for the knowledge evolution.

5. The system of claim 1 wherein the control unit is configured to format the data or the knowledge for analysis.

6. The system of claim 1 wherein the control unit is configured to iteratively evolve a knowledge model.

7. The system of claim 1 wherein the control unit is configured to iteratively extend the knowledge.

8. A method of operation of a computing system comprising:
performing an iteration of a process to extract, with a control unit, knowledge from data via application of a first algorithm, the first algorithm comprising an analysis algorithm for performing knowledge discovery;
performing the iteration of the process to perform a knowledge extension or a knowledge evolution on the data or the knowledge by applying a second algorithm, the second algorithm comprising an analysis algorithm for performing knowledge engineering;
selecting dynamically a correct converter from multiple types of converters, the dynamic selection based on matching a data type of an input and a data type of an output of the correct converter to a data type of an input to be processed by a selected analysis algorithm,
wherein the multiple types of converters comprise at least one of a converter for converting structured data for use by an analysis algorithm, a converter for converting unstructured data for use by an analysis algorithm, or a converter for converting semi-structured data for use by an analysis algorithm, and
wherein the multiple types of converters include a knowledge converter to transform data represented as a graph into an incidence matrix, an adjacency matrix, a Laplacian matrix, or a distance matrix,
wherein performing knowledge discovery comprises extracting knowledge from the data via application of the first algorithm, the first algorithm implementing an updatable knowledge model, and
wherein performing knowledge engineering comprises updating one or more of the updatable knowledge model or a schema included as part of the updatable knowledge model; and
interacting with a knowledge discovery component for extracting the knowledge, a knowledge engineering component for performing the knowledge extension or the knowledge evolution, and a data handler component to dynamically detect the correct converter.

9. The method of claim 8 wherein performing the knowledge extension or the knowledge evolution on the data or the knowledge includes evolving or extending the knowledge not restricted to the schema included as part of the updatable knowledge model.

10. The method of claim 8 further comprising generating a knowledge candidate for the knowledge extension.

11. The method of claim 8 further comprising generating a model candidate for the knowledge evolution.

12. The method of claim 8 further comprising formatting the data or the knowledge for analysis.

13. The method of claim 8 further comprising iteratively evolving a knowledge model.

14. The method of claim 8 further comprising iteratively extending the knowledge.

15. A non-transitory computer-readable medium including instructions for execution by a processor of a computer system, the instructions configured to, when executed by the processor, cause the processor to:
perform an iteration of a process for extracting knowledge from data via application of a first algorithm, the first algorithm comprising an analysis algorithm for performing knowledge discovery;
perform the iteration of the process to perform a knowledge extension or a knowledge evolution on the data or the knowledge by application of a second algorithm, the second algorithm comprising an analysis algorithm for performing knowledge engineering;
select dynamically a correct converter from multiple types of converters, the dynamic selection based on matching a data type of an input and a data type of an output of the correct converter to a data type of an input to be processed by a selected analysis algorithm, wherein the multiple types of converters comprise at least one of a converter for converting structured data for uses by an analysis algorithm, a converter for converting unstructured data for use by an analysis algorithm, or a converter for converting semi-structured data for use by an analysis algorithm, wherein the multiple types of converters include a knowledge converter to transform data represented as a graph into an incidence matrix, an adjacency matrix, a Laplacian matrix, or a distance matrix, wherein performing knowledge discovery comprises extracting knowledge from the data via application of the first algorithm, the first algorithm implementing an updatable knowledge model, and wherein performing knowledge engineering comprises updating one or more of the updatable knowledge model or a schema included as part of the updatable knowledge model; and interact with a knowledge discovery component for extracting the knowledge, a knowledge engineering component for performing the knowledge extension or the knowledge evolution and a data handler component to dynamically detect the correct converter.

16. The non-transitory computer-readable medium of claim 15, wherein performing the knowledge extension or the knowledge evolution on the data or the knowledge includes evolving or extending the knowledge not restricted to the schema included as part of the updatable knowledge model.

17. The non-transitory computer-readable medium of claim 15, further comprising instructions, which when executed by the processor, cause the computer system to generate a knowledge candidate for the knowledge extension.

18. The non-transitory computer-readable medium of claim 15, further comprising instructions, which when executed by the processor, cause the computer system to generate a model candidate for the knowledge evolution.

19. The non-transitory computer-readable medium of claim 15, further comprising instructions, which when executed by the processor, cause the computer system to format the data or the knowledge for analysis.

20. The non-transitory computer-readable medium of claim 15, further comprising instructions, which when executed by the processor, cause the computer system to iteratively evolve a knowledge model.

21. The non-transitory computer-readable medium of claim 15, further comprising instructions, which when executed by the processor, cause the computer system to iteratively extend the knowledge.

* * * * *

UNITED STATES PATENT AND TRADEMARK OFFICE
CERTIFICATE OF CORRECTION

PATENT NO. : 10,685,287 B2
APPLICATION NO. : 14/186309
DATED : June 16, 2020
INVENTOR(S) : Doreen Cheng et al.

It is certified that error appears in the above-identified patent and that said Letters Patent is hereby corrected as shown below:

On the Title Page

Item (54) and in the Specification, Column 1, Line 1, "COMPUTING WITH ITERATIVE" should be changed to --COMPUTING SYSTEM WITH ITERATIVE--.

Signed and Sealed this
Twenty-first Day of July, 2020

Andrei Iancu
*Director of the United States Patent and Trademark Office*